United States Patent Office 3,003,999
Patented Oct. 10, 1961

3,003,999
STABILIZED POLYVINYL COMPOSITIONS FOR USE IN FOOD PACKAGING
Otto S. Kauder, Jamaica, and Norman L. Perry, Seaford, N.Y., assignors to Argus Chemical Corporation, a corporation of New York
No Drawing. Filed Mar. 15, 1960, Ser. No. 15,059
16 Claims. (Cl. 260—45.75)

This invention relates to polyvinyl chloride resin compositions having remarkable heat stability, and which are safe to use in food packaging, stabilized by a combination of the mixed calcium and zinc salts of the mixed fatty acids derived from edible fats and oils, and sorbitol.

In recent years a number of patents have issued showing how to stabilize polyvinyl chloride resins using organotin compounds. Among these patents are Nos. 2,883,363, issued April 21, 1959, 2,872,468, issued February 3, 1959, 2,870,182 and 2,870,119, issued January 20, 1959, all to Leistner and Hecker, No. 2,914,506, issued November 24, 1959 to Mack and Parker, and 2,801,258, issued July 30, 1957 to Johnson. Organotin compounds because of their unusual heat stabilizing properties have now set a standard for heat stability which remains unequaled. However, the organotin compounds have the disadvantage that they are toxic, and this limits their use to applications where toxicity is not a problem. Moreover, most of these compounds are liquids, and therefore of limited utility with rigid vinyl polymers.

In accordance with the instant invention, polyvinyl chloride resins which are safe for use in food packaging and which have excellent heat stability are obtained using as the stabilizer system a combination of the calcium and zinc salts of the mixed fatty acids derived from edible fats and oils and sorbitol. The stability to long term heating imparted by this combination is extremely good, equaling or bettering that furnished, for example, by alkyl tin mercaptides. Because the stabilizer combination is a solid, this stabilization is obtainable without deterioration of any of the other properties of the resin. The compositions of the invention are stable at the extraordinarily high temperatures which are required in the case of rigid polymers, as compared to plasticized polyvinyl chloride resins, i.e., at temperatures of 375° F. and higher. They also are safe to use in food packaging, which makes it possible to use rigid nonplasticized polyvinyl chloride resin compositions of the invention in the fabrication of food containers.

The stabilizer system of the invention is far more effective than any if the ingredients thereof taken alone or in pairs, showing that the combination of all three components, i.e., the calcium salts and zinc salts of the mixed fatty acids derived from edible fats and oils and sorbitol, gives a synergistic effect. Combinations, for example, of calcium stearate and sorbitol, of zinc stearate and sorbitol, and of zinc and calcium stearates, such as are disclosed in Patent No. 2,711,401 to Robert E. Lally, patented June 21, 1955, are not sufficiently effective stabilizers at the elevated processing temperatures, i.e., 375° F. and higher, required in the processing of rigid polymers to be useful stabilizers.

The proportions of the three components of the stabilizer system of the invention are quite critical in obtaining effective stabilization under the required conditions. Preferably, equal proportions of each component, i.e., of the zinc salts, calcium salts and sorbitol, are employed. However, good stabilization is obtained at proportions within the range from about 25 to about 40 parts of calcium salts, from about 25 to about 40 parts of zinc salts, and from about 20 to about about 50 parts of sorbitol. It will be understood that the term "salts" refers to the salts of the mixed fatty acids derived from edible fats and oils. Exemplary are the mixed fatty acids derived from tallow, coconut oil, cottonseed oil, soybean oil, corn oil and peanut oil. The oils from which the fatty acids are derived may be hydrogenated, if desired. Also useful are the distilled fractionated fatty acid mixtures derived from such oils.

The amount of the stabilizer system should be sufficient to permit heating of the stabilized polyvinyl chloride resin composition at 375° F. for at least one hour without the development of heat decomposition. Usually, from 3 to 6% stabilizer system by weight of the resin will be sufficient to meet most needs in use. Good resistance to heat deterioration is obtainable employing only small amounts of the stabilizer system, as little as 1% by weight of the resin. The more stabilizer employed, the better the resistance to heat deterioration, up to amounts of 6% by weight of the resin. Beyond this, the stabilization effect may not be greatly enhanced, and such larger amounts may accordingly be wasteful. However, amounts up to 10% can be employed if desired.

The invention is applicable to any polyvinyl chloride resin. The term "polyvinyl chloride" as used herein is inclusive not only of polyvinyl chloride homopolymers but also of copolymers of vinyl chloride in a major proportion and other copolymerizable monomers in a minor proportion, such as copolymers of vinyl chloride and vinyl acetate, copolymers of vinyl chloride and vinylidene chloride, copolymers of vinyl chloride with maleic or fumaric acid, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

The invention is of particular application to the stabilization of rigid polyvinyl chloride resin compositions, that is, resin compositions which are formulated to withstand high temperatures, of the order of 375° F. and higher. Plasticization of such polymers is permissible provided this does not reduce the softening point of the resin to below the temperature to which it must be subjected. However, the stabilizer systems of the invention can be used with plasticized polyvinyl chloride resin compositions of conventional formulation where high softening point is not a requisite. Conventional plasticizers well known to those skilled in the art can be employed such as, for example, dioctyl phthalate and octyl diphenyl phosphate.

The preparation of the stabilized resin composition is easily accomplished by conventional procedures. The selected stabilizer system ordinarily is blended with the polyvinyl chloride resin using, for instance, plastic mixing rollers at a temperature at which the mix is fluid and thorough blending facilitated, milling the stabilizer system with the resin on a two roll mill at from 300 to 400° F. for a time sufficient to form a homogeneous sheet. The plasticizer, if one is employed, is incorporated with the stabilizer. Usually, five minutes milling time is adequate. After the mass is uniform, it is sheeted in the usual way.

The following examples in the opinion of the inventors constitute the preferred embodiments of their invention.

*Example 1*

Plastic composition:                     Parts by weight
    Geon 103 Ep (homoplymer of
        polyvinyl chloride) _____ 150
    Stabilizer system as noted in Table I _____ 9

The stabilizers were blended with the polyvinyl chloride on a two roll mill up to 375° F. and then held in an oven at 375° F. to determine their heat stability. The discoloration was noted and is reported in Table I below.

cases the stabilization ended after about 30 minutes of heating, and in the rtmaining cases, heat decomposition set in after about 60 minutes of heating.

TABLE I

| | Parts per 150 Parts of Resin | Heat Discoloration for Minutes of Heating | | | | | | | |
|---|---|---|---|---|---|---|---|---|---|
| | | Initial | 15 | 30 | 45 | 60 | 75 | 90 | 105 | 120 |
| Control—no stabilizer | | White | Dark Brown | Black | Black | Black | Black | Black | Black | Black. |
| A. Calcium salts of tallow fatty acids | 9 | Medium Brown | ...do | Dark Brown | Dark Brown | ...do | ...do | ...do | ...do | Do. |
| B. Zinc salts of tallow fatty acids | 9 | White | Black | Black | Black | ...do | ...do | ...do | ...do | Do. |
| C. Sorbitol | 9 | ...do | Dark Grey | ...do | ...do | ...do | ...do | ...do | ...do | Do. |
| D. Calcium salts of tallow fatty acids<br>Zinc salts of tallow fatty acids | 4.5<br>4.5 | Pink | Black | ...do | ...do | ...do | ...do | ...do | ...do | Do. |
| E. Calcium salts of tallow fatty acids<br>Sorbitol | 4.5<br>4.5 | ..do | Reddish Brown | Dark Reddish Brown | ...do | ...do | ...do | ...do | ...do | Do. |
| F. Zinc salts of tallow fatty acids<br>Sorbitol | 4.5<br>4.5 | Cream | Bright Yellow | Bright Yellow | Yellow—Black Edges | ...do | ...do | ...do | ...do | Do. |
| G. Calcium salts of tallow fatty acids<br>Zinc salts of tallow fatty acids<br>Sorbitol 1:1:1 | 3.0<br>3.0<br>3.0 | ..do | Light Brown | Light Brown | Light Brown | Light Brown | Light Brown | Light Brown | Light Brown | Light Brown. |
| H. Calcium salts of tallow fatty acids<br>Zinc salts of tallow fatty acids<br>Glycerol 1:1:1 | 3.0<br>3.0<br>3.0 | White | Yellow | Yellow—Black Edges | Black | Black | Black | Black | Black | Black. |
| I. Calcium salts of tallow fatty acids<br>Zinc salts of tallow fatty acids<br>Sorbitol | 1.8<br>1.2<br>6.0 | Cream | Light Brown | Dark Reddish Brown | ...do | ...do | ...do | ...do | ...do | Do. |
| J. Calcium salts of tallow fatty acids<br>Zinc salts of tallow fatty acids<br>Glycerol | 1.8<br>1.2<br>6.0 | White | Yellow | Dark Brown | ...do | ...do | ...do | ...do | ...do | Do. |

It is apparent from the above results that the stabilizer system of the invention in the proportions indicated in G gave by far the best results. The calcium salts of mixed tallow fatty acids, zinc salts of mixed tallow fatty acids and sorbitol alone, A, B and C, respectively, were completely ineffective, being no better than the control. The combinations of two of these, the mixed calcium and zinc salts of mixed tallow fatty acids, calcium salts of mixed tallow fatty acids and sorbitol, and the zinc salts of tallow fatty acids and sorbitol, Samples D, E and F, respectively, gave a slight improvement in heat resistance, but not enough to be acceptable. The difference between these and G is very striking.

Substitution of glycerol for the sorbitol in G gives the stabilizer system of H, and this system is no more effective than D, E and F, the various permutations of pairs of the stabilizer system of the invention. This shows that the sorbitol is important to the stabilizer system of the invention.

Samples I and J are systems similar to G and H, but with different proportions. This pair of samples shows the importance of the proportions of the components of the stabilizer system of the invention; when the proportions are outside the claimed range of the invention, sorbitol is no better than glycerol.

The stabilizer system of the invention imparts a cream color to the stabilized resin formulation, but this is immaterial for many industrial uses such as pipes where good heat resistance is important. The very high heat resistance at 375° F. is, of course, a measure of the heat resistance at ordinary atmospheric temperatures and shows that the compositions of the invention have a useful life under such conditions of at least three times that of the other compositions tested. This is a remarkable improvement.

Tests showed Sample G to be nontoxic.

It is apparent from the above results that the stabilizer system of the invention gave a distinct improvement in preventing initial discoloration, and also discoloration after 120 minutes of heating. The other stabilizer combinations did not give nearly as good stability; in some

*Example 2*

A series of compositions was made up as in Example 1 employing a copolymer of 96% vinyl chloride and 4% vinyl acetate. Similar results were obtained.

*Example 3*

A stabilizer system was prepared composed of a mixture of the calcium salts of mixed fatty acids derived from tallow 3.6 parts, zinc salts of mixed tallow fatty acids 3.6 parts, and sorbitol 1.8 parts. This stabilizer system was used in accordance with Example 1 in the amount of 9 parts by weight with 150 parts by weight of Geon 103 Ep resin. The composition was then held in an oven at 375° F. to determine its heat stability. The color noted was as reported in Table II below.

TABLE II

Initial—Cream
After 15 minutes of heating—Light brown
After 30 minutes of heating—Light brown
After 45 minutes of heating—Light brown
After 60 minutes of heating—Light brown
After 75 minutes of heating—Light brown with dark edges
After 90 minutes of heating—Black In these proportions the stabilizer system does not impart quite as good heat resistance when used in the same amount as Sample G of Table I. However, better stabilization could be obtained by using more of the stabilizer system by weight of the resin.

*Example 4*

A stabilizer system was prepared composed of a mixture of the calcium salts of mixed fatty acids derived from tallow 2.25 parts, zinc salts of mixed tallow fatty acids 2.25 parts, and sorbitol 4.5 parts. This stabilizer system was used in accordance with Example 1 in the amount of 9 parts by weight with 150 parts by weight of Geon 103 Ep resin. The composition was then held in an oven at 375° F. to determine its heat stability. The color noted was as reported in Table III below.

TABLE III

Initial—Cream
After 15 minutes of heating—Light brown
After 30 minutes of heating—Light brown
After 45 minutes of heating—Light brown
After 60 minutes of heating—Light brown
After 75 minutes of heating—Light brown
After 90 minutes of heating—Light brown
After 105 minutes of heating—Light brown
After 120 minutes of heating—Black This stabilizer system is practically as good as Sample G of Table I, giving stabilization up to 105 minutes at 375° F. instead of up to 120 minutes.

Example 5

The series of formulations of Example 1 were prepared again, substituting calcium salts of the mixed fatty acids derived from coconut oil and zinc salts of the mixed fatty acids derived from coconut oil for the tallow fatty acids used in that example. The same results were obtained. The composition corresponding to Sample G imparted adequate heat resistance for 120 minutes of heating at 375° F., whereas the other composition tested gave stabilization only for about 45 minutes of heating.

Example 6

The series of formulations of Example 1 were prepared again, substituting calcium salts of the mixed fatty acids derived from hydrogenated cottonseed oil and zinc salts of the mixed fatty acids derived from hydrogenated cottonseed oil for the tallow fatty acids used in that example. The same results were obtained. The composition corresponding to Sample G imparted adequate heat resistance for 120 minutes of heating at 375° F., whereas the other compositions tested gave stabilization only for about 45 minutes of heating.

Example 7

The series of formulations of Example 1 were prepared again, substituting calcium salts of the mixed fatty acids derived from hydrogenated corn oil and zinc salts of the mixed fatty acids derived from hydrogenated corn oil for the tallow fatty acids used in that example. The same results were obtained. The composition corresponding to Sample G imparted adequate heat resistance for 120 minutes of heating at 375° F., whereas the other compositions tested gave stabilization only for about 45 minutes of heating.

Example 8

The series of formulations of Example 1 were prepared again, substituting calcium salts of the mixed fatty acids derived from peanut oil and zinc salts of the mixed fatty acids derived from peanut oil for the tallow fatty acids used in that example. The same results were obtained. The composition corresponding to Sample G imparted adequate heat resistance for 120 minutes of heating at 375° F., whereas the other compositions tested gave stabilization only for about 45 minutes of heating.

Example 9

A composition was prepared exactly as in Example 1 employing as the stabilizer system a mixture of 3 parts calcium salts of tallow fatty acids, 3 parts of zinc salts of tallow fatty acids, and 3 parts pentaerythritol. This stabilizer system was used in the amount of 9 parts by weight with 150 parts by weight of Geon 103 Ep resin. The stabilization obtained when the resin composition was held in an oven at 375° F. was equivalent to that of Sample G of Table I. Thus, pentaerythritol is an equivalent of sorbitol, but it would not be employed in the stabilizer systems of the invention at the present time, because pentaerythritol is not accepted as safe to use in food packaging.

We claim:

1. A polyvinyl chloride resin stabilizer composition capable of improving the resistance of the resin to heat deterioration when heated at 375° F. consisting essentially of the calcium salts of mixed fatty acids derived from edible fats and oils, the zinc salts of mixed fatty acids derived from edible fats and oils, and sorbitol, in the proportions of from about 25 to about 40 parts of the calcium salts, from about 25 to about 40 parts of the zinc salts, and from about 20 to about 50 parts of sorbitol.

2. A polyvinyl chloride resin stabilizer composition in accordance with claim 1 in which the calcium salts, zinc salts and sorbitol are in the proportion of 1:1:1.

3. A polyvinyl chloride resin stabilizer composition in accordance with claim 1 in which the fatty acids are tallow fatty acids.

4. A polyvinyl chloride resin stabilizer composition in accordance with claim 1 in which the fatty acids are coconut oil fatty acids.

5. A polyvinyl chloride resin stabilizer composition in accordance with claim 1 in which the fatty acids are hydrogenated cottonseed oil fatty acids.

6. A polyvinyl chloride resin stabilizer composition in accordance with claim 1 in which the fatty acids are hydrogenated corn oil fatty acids.

7. A polyvinyl chloride resin stabilizer composition in accordance with claim 1 in which the fatty acids are peanut oil fatty acids.

8. A polyvinyl chloride resin composition having improved resistance to heat deterioration consisting essentially of a polyvinyl chloride resin, and a stabilizer composition consisting essentially of calcium salts of mixed fatty acids derived from edible fats and oils, the zinc salts of mixed fatty acids derived from edible fats and oils, and sorbitol, in the proportions of from about 25 to about 40 parts of the calcium salts, from about 25 to about 40 parts of the zinc salts, and from about 20 to about 50 parts of sorbitol, the said stabilizer composition being present in an amount to improve the resistance to heat deterioration when the composition is heated at 375° F.

9. A polyvinyl chloride resin composition in accordance with claim 8 in which the polyvinyl chloride resin is a polyvinyl chloride homopolymer.

10. A polyvinyl chloride resin composition in accordance with claim 8 in which the polyvinyl chloride resin is a copolymer of vinyl chloride and vinyl acetate.

11. A polyvinyl chloride resin composition in accordance with claim 8 in which the calcium salts, zinc salts and sorbitol are in the proportion of 1:1:1.

12. A polyvinyl chloride resin composition in accordance with claim 8 in which the fatty acids are tallow fatty acids.

13. A polyvinyl chloride resin composition in accordance with claim 8 in which the fatty acids are coconut oil fatty acids.

14. A polyvinyl chloride resin composition in accordance with claim 8 in which the fatty acids are hydrogenated cottonseed oil fatty acids.

15. A polyvinyl chloride resin composition in accordance with claim 8 in which the fatty acids are hydrogenated corn oil fatty acids.

16. A polyvinyl chloride resin composition in accordance with claim 8 in which the fatty acids are peanut oil fatty acids.

References Cited in the file of this patent

UNITED STATES PATENTS 2,711,401    Lally _____ June 21, 1955
2,918,451    Elliott _____ Dec. 22, 1959